(12) United States Patent
Kim et al.

(10) Patent No.: US 9,995,371 B2
(45) Date of Patent: Jun. 12, 2018

(54) PLANETARY GEAR TRAIN OF AUTOMATIC TRANSMISSION FOR VEHICLES

(71) Applicant: Hyundai Motor Company, Seoul (KR)

(72) Inventors: Jong Soo Kim, Seoul (KR); Dong Hwan Hwang, Seoul (KR); Seong Wook Hwang, Gunpo-si (KR); Chang Wook Lee, Suwon-si (KR); Wonmin Cho, Hwaseong-si (KR); Hyun Sik Kwon, Seoul (KR); Jong Sool Park, Hwaseong-si (KR); Kyeong Hun Lee, Seoul (KR); Seongwook Ji, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/198,420

(22) Filed: Jun. 30, 2016

(65) Prior Publication Data

US 2017/0167578 A1    Jun. 15, 2017

(30) Foreign Application Priority Data

Dec. 10, 2015 (KR) .......................... 10-2015-0176144

(51) Int. Cl.
   *F16H 3/66*   (2006.01)

(52) U.S. Cl.
   CPC ............... *F16H 3/666* (2013.01); *F16H 3/66* (2013.01); *F16H 2200/0065* (2013.01); *F16H 2200/2012* (2013.01); *F16H 2200/2046* (2013.01)

(58) Field of Classification Search
   CPC .... F16H 3/66; F16H 3/666; F16H 2200/0065; F16H 2200/2012; F16H 2200/2046
   See application file for complete search history.

(56) References Cited

U.S. PATENT DOCUMENTS

| 3,503,282 | A  | * | 3/1970 | Peterson | ............... | F16H 3/66 475/276 |
| 7,163,484 | B2 | * | 1/2007 | Klemen   | ............... | F16H 3/66 475/276 |
| 8,430,785 | B2 | * | 4/2013 | Beck     | ............... | F16H 3/66 475/277 |

(Continued)

FOREIGN PATENT DOCUMENTS

| JP | 5526235 B2      | 6/2014  |
| KR | 10-2010-0007507 A | 1/2010  |
| KR | 10-2012-0132021 A | 12/2012 |

*Primary Examiner* — Jacob S. Scott
*Assistant Examiner* — Tinh Dang
(74) *Attorney, Agent, or Firm* — Morgan, Lewis & Bockius LLP (57) ABSTRACT

A planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and six friction elements disposed to selectively connect the rotation elements, or to selectively connect at least one rotation element and a transmission housing.

10 Claims, 2 Drawing Sheets

(56) References Cited

U.S. PATENT DOCUMENTS

| | | | | |
|---|---|---|---|---|
| 8,529,395 B2* | 9/2013 | Wittkopp | ................ | F16H 3/663 |
| | | | | 475/280 |
| 8,840,520 B2* | 9/2014 | Neelakantan | ........... | F16H 59/38 |
| | | | | 475/280 |
| 9,429,215 B2* | 8/2016 | Noh | .......................... | F16H 3/66 |
| 2015/0111688 A1 | 4/2015 | Beck et al. | | |
| 2016/0363192 A1* | 12/2016 | Lee | ........................... | F16H 3/66 |

* cited by examiner

| Speed stage | Friction element | | | | | | Gear ratio | Step ratio | Span of gear ratio |
|---|---|---|---|---|---|---|---|---|---|
| | C1 | C2 | C3 | B1 | B2 | B3 | | | |
| D1 | | | ● | ● | ● | | 5.069 | - | 9.575 |
| D2 | | | ● | | ● | ● | 3.197 | 1.585 | |
| D3 | | ● | ● | | ● | | 2.229 | 1.434 | |
| D4 | ● | | ● | | ● | | 1.754 | 1.271 | |
| D5 | ● | ● | | | ● | | 1.286 | 1.364 | |
| D6 | ● | ● | ● | | | | 1.000 | 1.286 | |
| D7 | ● | ● | | | | ● | 0.801 | 1.248 | |
| D8 | ● | | ● | | | ● | 0.675 | 1.186 | |
| D9 | ● | | ● | ● | | | 0.529 | 1.276 | |
| REV | | ● | | ● | ● | | -4.310 | - | - |

United States Patent US 9,995,371 B2

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2015-0176144, filed Dec. 10, 2015, the entire contents of which is incorporated herein for all purposes by this reference.

BACKGROUND OF THE INVENTION

Field of the Invention

The present invention relates to a planetary gear train of an automatic transmission for a vehicle. More particularly, the present invention relates to a planetary gear train of an automatic transmission for a vehicle which improves power delivery performance and fuel efficiency as a consequence of achieving nine forward speed stages using a minimum number of constituent elements, enlarging a span of gear ratios, and linearly increasing or decreasing step ratios between speed stages.

Description of Related Art

The recent increase in oil prices has caused car makers to meet global demands for improving fuel efficiency. As a result, research is being conducted on engines in terms of reducing weight and improving fuel efficiency by downsizing, and research is also being conducted to ensure both drivability and competitiveness for maximizing fuel efficiency by implementing an automatic transmission with multiple speed stages.

However, in the automatic transmission, the number of internal components is increased as the number of gear shift stages is increased, and as a result, the automatic transmission may be difficult to mount, the manufacturing cost and weight may be increased, and power transmission efficiency may be deteriorated.

Accordingly, development of a planetary gear train which may bring about maximum efficiency with a small number of components is important in order to increase fuel efficiency enhancement effect through the multiple speed stages.

In this aspect, in recent years, automatic transmissions capable of achieving 8-speeds have been implemented and the research and development of a planetary gear train capable of implementing more speed stages has also been actively conducted.

Since a span of gear ratios of the recent 8-speed automatic transmission is merely 6.5 to 7.5, the 8-speed automatic transmission has no great effect of improving fuel efficiency.

In addition, since step ratios between speed stages may not be increased or decreased linearly in a case in which a span of gear ratios of the 8-speed automatic transmission is greater than or equal to 9.0, driving efficiency of an engine and drivability, of a vehicle may be deteriorated.

Accordingly, there is a need for development of a high efficient automatic transmission with 9 or more forward speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that improves power delivery performance and fuel efficiency by achieving at least nine forward speed stages and one reverse speed stage using a minimum number of constituent elements, by enlarging a span of gear ratios, and by linearly increasing or decreasing step ratios between speed stages.

According to various aspects of the present invention, a planetary gear train of an automatic transmission for a vehicle, may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and six friction elements disposed to selectively connect the rotation elements, or to selectively connect at least one rotation element and a transmission housing, in which the input shaft may be continuously connected to the first rotation element, the output shaft may be continuously connected to the eleventh rotation element, the second rotation element may be continuously connected to the sixth rotation element, the fourth rotation element may be continuously connected to the tenth rotation element, the fifth rotation element may be continuously connected to the eighth rotation element, and the ninth rotation element may be continuously connected to the twelfth rotation element.

The fourth rotation element may be selectively connected to the transmission housing, the third rotation element may be selectively connected to the transmission housing, the input shaft may be selectively connected to the eighth rotation element, the input shaft may be selectively connected to the seventh rotation element, the third rotation element may be selectively connected to the seventh rotation element, and the second rotation element may be selectively connected to the transmission housing.

A sun gear, a planet carrier, and a ring gear of the first planetary gear set may be set as the first, second, and third rotation elements, a sun gear, a planet carrier, and a ring gear of the second planetary gear set may be set as the fourth, fifth, and sixth rotation elements, a sun gear, a planet carrier, and a ring gear of the third planetary gear set may be set as the seventh, eighth, and ninth rotation elements, and a sun gear, a planet carrier, and a ring gear of the fourth planetary gear set may be set as the tenth, eleventh, and twelfth rotation elements.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and six friction elements disposed to selectively connect the rotation elements, or selectively connect at least one of the rotation elements and a transmission housing, in which the planetary gear train of the automatic transmission for the vehicle further comprises a first rotation shaft including the first rotation element and directly connected to the input shaft, a second rotation shaft including the second rotation element and the sixth rotation element and selectively connected to the transmission housing, a third rotation shaft including the third rotation element and selectively connected to the transmission housing, a fourth rotation shaft including the fourth rotation element and the tenth rotation element and selectively connected to the transmission housing, a fifth rotation shaft including the eighth rotation element and the fifth rotation element and selectively connected to the input shaft, a sixth rotation shaft including the seventh rotation element and selectively connected to the third rotation shaft and the input shaft, a seventh rotation shaft including the ninth rotation element and the twelfth rotation element, and an eighth rotation shaft including the eleventh rotation element and the input shaft.

The first planetary gear set may be a double pinion planetary gear set and include a first sun gear as the first rotation element, a first ring gear as the second rotation element, and a planet carrier as the third rotation element, the second planetary gear set may be a single pinion planetary gear set and include a second sun gear as the fourth rotation element, a second planet carrier as the fifth rotation element, and a second ring gear as the sixth rotation element, the third planetary gear set may be a single pinion planetary gear set and include a third sun gear as the seventh rotation element, a third planet carrier as the eighth rotation element, and a third ring gear as the ninth rotation element, and the fourth planetary gear set may be a single pinion planetary gear set and include a fourth sun gear as the tenth rotation element, a fourth planet carrier as the eleventh rotation element, and a fourth ring gear as the twelfth rotation element.

The six friction elements may include a first clutch selectively connecting the input shaft and the fifth rotation shaft, a second clutch selectively connecting the input shaft and the sixth rotation shaft, a third clutch selectively connecting the third rotation shaft and the sixth rotation shaft, a first brake selectively connecting the second rotation shaft and the transmission housing, a second brake selectively connecting the fourth rotation shaft and the transmission housing, and a third brake selectively connecting the third rotation shaft and the transmission housing.

Speed stages achieved by selective operation of the six friction elements include a first forward speed stage achieved by simultaneous operation of the third clutch, the first brake and the second brake, a second forward speed stage achieved by simultaneous operation of the third clutch, the second brake and the third brake, a third forward speed stage achieved by simultaneous operation of the second clutch, the third clutch and the second brake, a fourth forward speed stage achieved by simultaneous operation of the first clutch, the third clutch and the second brake, a fifth forward speed stage achieved by simultaneous operation of the first clutch, the second clutch and the second brake, a sixth forward speed stage achieved by simultaneous operation of the first clutch, the second clutch and the third clutch, a seventh forward speed stage achieved by simultaneous operation of the first clutch, the second clutch and the third brake, an eighth forward speed stage achieved by simultaneous operation of the first clutch, the third clutch and the third brake, a ninth forward speed stage achieved by simultaneous operation of the first clutch, the third clutch and the first brake, and a reverse speed stage achieved by simultaneous operation of the second clutch, the first brake and the second brake.

According to various aspects of the present invention, a planetary gear train of an automatic transmission for a vehicle may include an input shaft receiving torque of an engine, an output shaft outputting changed torque of the engine, a first planetary gear set being a double pinion planetary gear set and including first, second, and third rotation elements, a second planetary gear set being a single pinion planetary gear set and including fourth, fifth, and sixth rotation elements, a third planetary gear set being a single pinion planetary gear set and including seventh, eighth, and ninth rotation elements, and a fourth planetary gear set being a single pinion planetary gear set and including tenth, eleventh, and twelfth rotation elements, in which the planetary gear train of an automatic transmission for a vehicle may include a first rotation shaft including the first rotation element and directly connected to the input shaft, a second rotation shaft including the second rotation element and the sixth rotation element and selectively connected to the transmission housing, a third rotation shaft including the third rotation element and selectively connected to the transmission housing, a fourth rotation shaft including the fourth rotation element and the tenth rotation element and selectively connected to the transmission housing, a fifth rotation shaft including the fifth rotation element and the eighth rotation element and selectively connected to the input shaft, a sixth rotation shaft including the seventh rotation element and selectively connected to the third rotation shaft and the input shaft, a seventh rotation shaft including the ninth rotation element and the twelfth rotation element, an eighth rotation shaft including the eleventh rotation element and directly connected to the output shaft, a first clutch selectively connecting the input shaft and the fifth rotation shaft, a second clutch selectively connecting the input shaft and the sixth rotation shaft, a third clutch selectively connecting the third rotation shaft and the sixth rotation shaft, a first brake selectively connecting the second rotation shaft and the transmission housing, a second brake selectively connecting the fourth rotation shaft and the transmission housing, and a third brake selectively connecting the third rotation shaft and the transmission housing.

The first planetary gear set includes a first sun gear as the first rotation element, a first ring gear as the second rotation element, and a first planet carrier as the third rotation element, the second planetary gear set includes a second sun gear as the fourth rotation element, a second planet carrier as the fifth rotation element, and a second ring gear as the sixth rotation element, the third planetary gear set includes a third sun gear as the seventh rotation element, a third planet carrier as the eighth rotation element, and a third ring gear as the ninth rotation element, and the fourth planetary gear set includes a fourth sun mar as the tenth rotation element, a fourth planet carrier as the eleventh rotation element, and a fourth ring gear as the twelfth rotation element.

According to various aspects of the present invention, a planetary gear train of an automatic transmission for a vehicle may include an input shaft receiving torque of an engine, an output shaft outputting changed torque, a first planetary gear set that may be a double pinion planetary gear set and includes a first sun gear, a first planet carrier, and a first ring gear, a second planetary gear set that may be a single pinion planetary gear set and includes a second sun gear, a second planet carrier, and a second ring gear, a third planetary gear set that may be a single pinion planetary gear set and includes a third sun gear, a third planet carrier, and a third ring gear, and a third planetary gear set that may be a single pinion planetary gear set and includes a third sun gear, a third planet carrier, and a third ring gear, and in which the planetary gear train of the automatic transmission for the vehicle may include a first rotation shaft including the first sun gear and directly connected to the input shaft, a second rotation shaft including the first ring gear and the second ring gear and selectively connected to the transmission housing, a third rotation shaft including the first planet carrier and selectively connected to the transmission housing, a fourth rotation shaft including the second sun gear and the fourth sun gear and selectively connected to the transmission housing, a fifth rotation shaft including the second planet carrier and the third planet carrier and selectively connected to the input shaft, a sixth rotation shaft including the third sun gear and selectively connected to the third rotation shaft and the input shaft, a seventh rotation shaft including the third ring gear and the fourth ring gear, an eighth rotation shaft including the fourth planet carrier and directly connected to the output shaft, and six friction elements disposed to selectively connect the rotation shafts, or selectively connect the rotation shaft and transmission housing.

A planetary gear train of an automatic transmission for a vehicle according to various embodiments of the present invention may achieve at least nine forward speed stages and one reverse speed stage by combining four planetary gear sets that are simple planetary gear sets with six friction elements.

In addition, engine driving efficiency may be maximized by achieving a span of gear ratios to be greater than or equal to 9.5.

In addition, drivability such as acceleration before and after the shift and rhythm of engine speed may be improved by high efficiency multiple speed stages and securing linearity of step ratios between speed stages.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
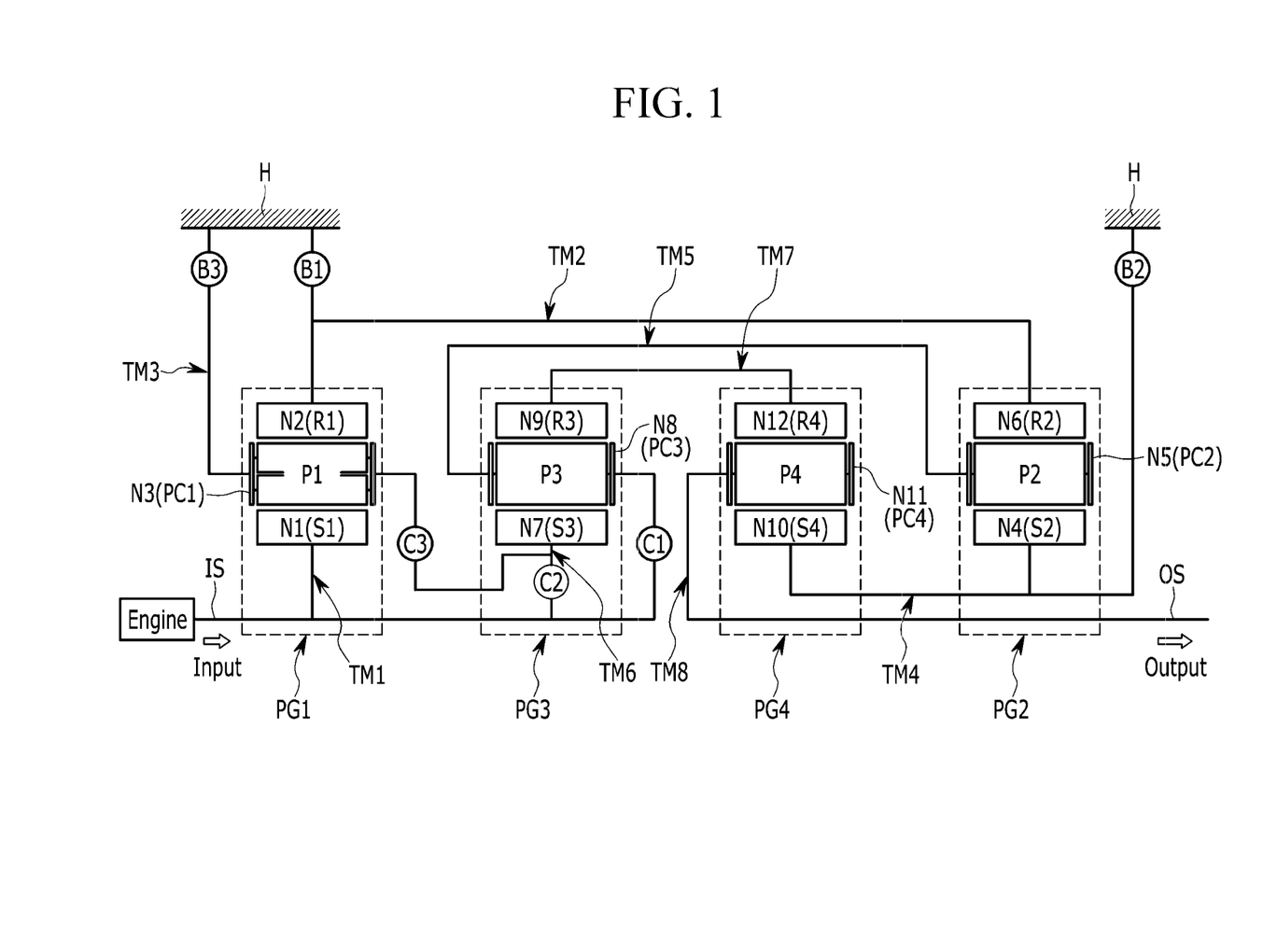
FIG. 1 is a schematic diagram of an exemplary planetary gear train according to the present invention.

FIG. 1 is a schematic diagram of a planetary gear train according to various embodiments of the present invention.

Referring to FIG. 1, a planetary gear train according to various embodiments of the present invention includes first, second, third, fourth planetary gear sets PG1, PG2, PG3, and PG4 disposed on the same axis, an input shaft IS, an output shaft OS, eight rotations shafts TM1 to TM8 including at least one rotation elements of the first, second, third, and fourth planetary gear sets PG1, PG2, PG3, and PG4, six friction elements C1 to C3 and B1 to B3, and a transmission housing H.

As a result, torque input from the input shaft IS is changed by cooperation of the first, second, third, and fourth planetary gear sets PG1, PG2, PG3, and PG4, and the changed torque is output through the output shaft OS.

The planetary gear sets PG1, PG2, PG3, and PG4 are disposed sequentially from an engine side.

The input shaft IS is an input member and power from a crankshaft of an engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 is a double pinion planetary gear set and includes a first sun gear S1 of a first rotation element N1, a first ring gear R1 of a second rotation element N2 internally engaged with a first pinion P1 externally engaged with the first sun gear S1, and a first planet carrier PC1 of a third rotation element N3 supporting the first pinion P1.

The second planetary gear set PG2 is a single pinion planetary gear set and includes a second sun gear S2 of a fourth rotation element N4, a second planet carrier PC2 of a fifth rotation element N5 rotatably supporting a second pinion P2 externally engaged the second sun gear S2, and a second ring gear of a sixth rotation element N6 internally engaged with the second pinion P2.

The third planetary gear set PG3 is a single pinion planetary gear set and includes a third sun gear S3 of a seventh rotation element N7, a third planet carrier PC3 of an eighth rotation element N8 rotatably supporting a third pinion P3 externally engaged with the third sun gear S3, and a third ring gear R3 of a ninth rotation element N9 internally engaged with the third pinion P3.

The fourth planetary gear set PG4 is a single pinion planetary gear set and includes a fourth sun gear S4 of a tenth rotation element N10, a fourth planet carrier PC4 of an eleventh rotation element N11 rotatably supporting a fourth pinion P4 externally engaged with the fourth sun gear S4, and a fourth ring gear R4 of a twelfth rotation element N12 internally engaged with the fourth pinion P4.

The second rotation element N2 is directly connected to the sixth rotation element N6, the fifth rotation element N5 is directly connected to the eighth rotation element N8, the ninth rotation element N9 is directly connected to the twelfth rotation element N12, and the first, second, third, and fourth planetary gear sets PG1, PG2, PG3, and PG4 are operated with eight rotation shafts TM1 to TM8.

The eight rotation shafts TM1 to TM8 will be described in further detail.

The first rotation shaft TM1 includes the first rotation element N1, and is directly connected to the input shaft IS so as to be continuously operated as an input element.

The second rotation shaft TM2 includes the second rotation element N2 and the sixth rotation element N6, and is selectively connected to the transmission housing H so as to be operated as a selective fixed element.

The third rotation shaft TM3 includes the third rotation element N3 and selectively connected to the transmission housing H so as to be operated as a selective fixed element.

The fourth rotation shaft TM4 includes the fourth rotation element N4 and the tenth rotation element N10, and is selectively connected to the transmission housing H so as to be continuously operated as a selective fixed element.

The fifth rotation shaft TM5 includes the fifth rotation element N5 and the eighth rotation element.

The sixth rotation shaft TM6 includes the seventh rotation element N7 and is selectively connected to the third rotation shaft TM3 and the input shaft IS so as to be operated as a selective input element.

The seventh rotation shaft TM7 includes the ninth rotation element N9 and the twelfth rotation element N12.

The eighth rotation shaft TM8 includes the eleventh rotation element N11 and is directly connected to the output shaft so as to be continuously operated as an output element.

In addition, three clutches C1, C2, and C3 which are friction elements are disposed at connection portions between any two rotation shafts.

In addition, three brakes B1, B2, and B3 which are friction elements are disposed at connection portions between any one rotation shaft and the transmission housing H.

The six friction elements C1 to C3 and B1 to B3 will be described in further detail.

The first clutch C1 is disposed between the input shaft IS and the fifth rotation shaft TM5 and selectively connects the input shaft IS and the fifth rotation shaft TM5.

The second clutch C2 is disposed between the input shaft IS and the sixth rotation shaft TM6 and selectively connects the input shaft IS and the sixth rotation shaft TM6.

The third clutch C3 is disposed between the third rotation shaft TM3 and the sixth rotation shaft TM6 and selectively connects the third rotation shaft TM3 and the sixth rotation shaft TM6.

The first brake B1 is disposed between the second rotation shaft TM2 and the transmission housing H and causes the second rotation shaft TM2 so as to be operated as a selective fixed element.

The second brake B2 is disposed between the fourth rotation shaft TM4 and the transmission housing H and causes the fourth rotation shaft TM4 so as to be operated as a selective fixed element.

The third brake B3 is disposed between the third rotation shaft TM3 and the transmission housing H and causes the third rotation shaft TM3 so as to be operated as a selective fixed element.

The friction elements including the first, second, and third clutches C1, C2, and C3 and the first, second, and third brakes B1, B2, and B3 may be multi-plates friction elements of wet type that are operated by hydraulic pressure.

Figure 2:
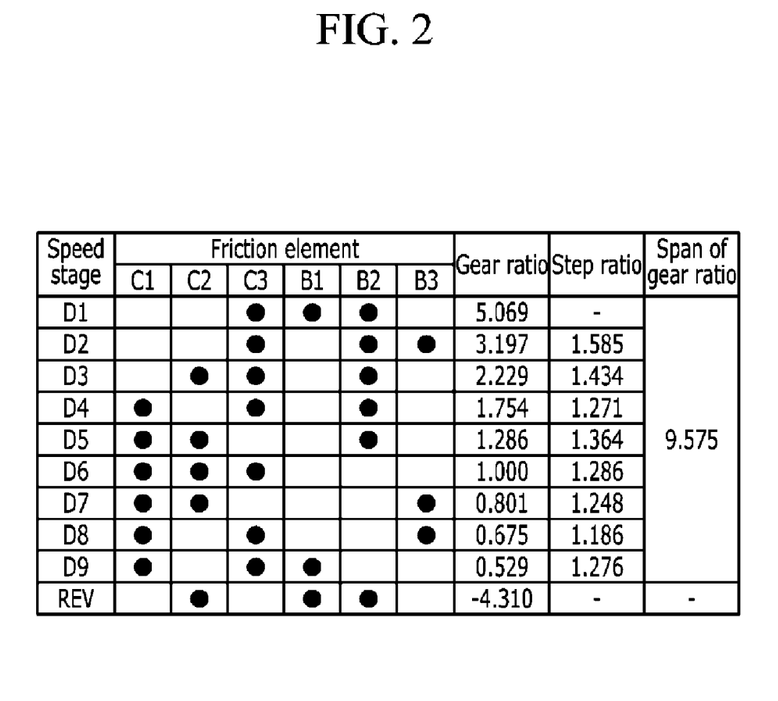
FIG. 2 is an operation chart of friction elements at each speed stage in the exemplary planetary gear train according to the present invention.

FIG. 2 is an operation chart of friction elements at each speed stage in the planetary gear train according to various embodiments of the present invention.

As shown in FIG. 2, three friction elements are operated at each speed stage in the planetary gear train according to various embodiments of the present invention. Shifting processes in various embodiments of the present invention will be described in further detail.

The third clutch C3, the first brake B1 and the second brake B2 are simultaneously operated at a first forward speed stage D1. According to this, as the third rotation shaft TM3 is connected to the sixth rotation shaft TM6 by operation of the third clutch C3, torque of the input shaft IS is input to the first rotation shaft TM1. Further, as the second rotation shaft TM2 and the fourth rotation shaft TM4 are operated as fixed elements by the operation of the first brake B1 and the second brake B2, and torque input is changed by cooperation of the each rotation shaft to be a first forward speed stage and the changed torque is output through the output shaft OS including the eighth rotation shaft TM8.

The third clutch C3, the second brake B2 and the third brake B3 are simultaneously operated at a second forward speed stage D2. According to this, the third rotation shaft TM3 is connected to the sixth rotation shaft TM6 by operation of the third clutch C3, torque of the input shaft IS is input to the first rotation shaft TM1. Further, as the fourth rotation shaft TM4 and third rotation shaft TM3 are operated as fixed elements by operation of the second brake B2 and the third brake B3, and torque input is changed by cooperation of the each rotation shaft to be a second forward speed stage and the changed torque is output through the output shaft OS including the eighth rotation shaft TM8.

The second clutch C2, the third clutch C3 and the second brake B2 are simultaneously operated at a third forward speed stage D3. According to this, the sixth rotation shaft TM6 is connected to the input shaft IS by operation of the second clutch C2, as the third rotation shaft TM3 is connected to the sixth rotation shaft TM6 by operation of the third clutch C3, torque of the input shaft IS is input to the first rotation shaft TM1 and the sixth rotation shaft TM6. Further, as the fourth rotation shaft TM4 is operated as a fixed element by operation of the second brake B2, and torque input is changed by cooperation of the each rotation shaft to be a third forward speed stage and the changed torque is output through the output shaft OS including the eighth rotation shaft TM5.

The first clutch C1, the third clutch C3 and the second brake B2 are simultaneously operated at a fourth forward speed stage D4. According to this, the fifth rotation shaft TM5 is connected to the input shaft IS by operation of the first clutch C1, as the third rotation shaft TM3 is connected to the sixth rotation shaft TM6 by operation of the third clutch C3, torque of the input shaft IS is input to the first rotation shaft TM1 and the fifth rotation shaft TM5. Further, as the fourth rotation shaft TM4 is operated as a fixed element by operation of the second brake B2, and torque input is changed by cooperation of the each rotation shaft to be a fourth forward speed stage and the changed torque is output through the output shaft OS including the eighth rotation shaft TM8.

The first clutch C1, the second clutch C2 and the second brake B2 are simultaneously operated at a fifth forward speed stage D5. According to this, the fifth rotation shaft TM5 is connected to the input shaft IS by operation of the first clutch C1, as the sixth rotation shaft TM6 is connected to the input shaft IS by operation of the second clutch C2, torque of the input shaft IS is input to the first rotation shaft TM1, the fifth rotation shaft TM5 and the sixth rotation shaft TM6. Further, as the fourth rotation shaft TM4 is operated as a fixed element by operation of the second brake B2, and torque input is changed by cooperation of the each rotation shaft to be a fifth forward speed stage and the changed torque is output through the output shaft OS including the eighth rotation shaft TM8.

The first clutch C1, the second clutch C2 and the third clutch C3 are simultaneously operated at a sixth forward speed stage D6. According to this, the fifth rotation shaft TM5 is connected to the input shaft IS by operation of the first clutch C1, as the sixth rotation shaft TM6 is connected to the input shaft IS by operation of the second clutch C2, torque of the input shaft IS is input to the first rotation shaft TM1, the fifth rotation shaft TM5 and the sixth rotation shaft TM6. Then, as the first, second, third, fourth planetary gear set PG1, PG2, PG3 and PG4 are integrally rotating, and torque input is changed to be a sixth forward speed stage and the changed torque is output through the output shaft OS including the eighth rotation shaft TM8.

The first clutch C1, the second clutch C2 and the third brake B3 are simultaneously operated at a seventh forward speed stage D7. According to this, the fifth rotation shaft TM5 is connected to the input shaft IS by operation of the first clutch C1, as the sixth rotation shaft TM6 is connected to the input shaft IS by operation of the second clutch C2, torque of the input shaft IS is input to the first rotation shaft TM1, the fifth rotation shaft TM5 and the sixth rotation shaft TM6. Further, as the third rotation shaft TM3 is operated as a fixed element by operation of the third brake B3, and torque input is changed by cooperation of the each rotation shaft to be a seventh forward speed stage and the changed torque is output through the output shaft OS including the eighth rotation shaft TM8.

The first clutch C1, the third clutch C3 and the third brake B3 are simultaneously operated at an eighth forward speed stage D8. According to this, the fifth rotation shaft TM5 is connected to the input shaft IS by operation of the first clutch C1, as the third rotation shaft TM3 is connected to the sixth rotation shaft TM6 by operation of the third clutch C3, torque of the input shaft IS is input to the first rotation shaft TM1 and the fifth rotation shaft TM5. Further, as the third rotation shaft TM3 is operated as a fixed element by operation of the third brake B3, and torque input is changed by cooperation of the each rotation shaft to be an eighth forward speed stage and the changed torque is output through the output shaft OS including the eighth rotation shaft TM8.

The first clutch C1, the third clutch C3 and the first brake B1 are simultaneously operated at a ninth forward speed stage D9. According to this, the fifth rotation shaft TM5 is connected to the input shaft IS by operation of the first clutch C1, as the third rotation shaft TM3 is connected to the sixth rotation shaft TM6 by operation of the third clutch C3, torque of the input shaft IS is input to the first rotation shaft TM1 and the fifth rotation shaft TM5. Further, as the second rotation shaft TM2 is operated as a fixed element by operation of the first brake B1, and torque input is changed by cooperation of the each rotation shaft to be a ninth forward speed stage and the changed torque is output through the output shaft OS including the eighth rotation shaft TM8.

The second clutch C2, the first brake B1 and the second brake B2 are simultaneously operated at a reverse speed stage REV. According to this, as the sixth rotation shaft TM6 is connected to the input shaft IS by operation of the second clutch C2, torque of the input shaft IS is input to the first rotation shaft TM1 and the sixth rotation shaft TM6. Further, as the second rotation shaft TM2 and the fourth rotation shaft TM4 are operated as fixed elements by operation of the first brake B1 and the second brake B2, and torque input is changed by cooperation of the each rotation shaft to be a reverse speed stage and the changed torque is output through the output shaft OS including the eighth rotation shaft TM8.

The planetary gear train according to various embodiments of the present invention may achieve at least nine forward speed stages and one reverse speed stage by controlling four planetary gear sets P11, P12, PG3, and PG4 with three clutches C1, C2, and C3 and three brakes B1, B2, and B3.

In addition, engine driving efficiency may be maximized by achieving a span of gear ratios to be greater than or equal to 9.5.

In addition, drivability such as acceleration before and after the shift and rhythm of engine speed may be improved by high efficiency multiple speed stages and securing linearity of step ratios between speed stages to be at least 1.2 at all speed stages except speed stage of ⅞ step ratio.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving torque of an engine;
   an output shaft outputting changed torque of the engine;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements; and
   six friction elements disposed to selectively connect the rotation elements, or to selectively connect at least one rotation element and a transmission housing,
   wherein:
      the input shaft is fixedly connected to the first rotation element such that the first rotation element always rotates at a speed of the input shaft;
      the output shaft is fixedly connected to the eleventh rotation element such that the output shaft always rotates at a speed of the eleventh rotation element;
      the second rotation element is fixedly connected to the sixth rotation element such that the second and sixth rotation elements always rotate at a same speed;
      the fourth rotation element is fixedly connected to the tenth rotation element such that the fourth and tenth rotation elements always rotate at a same speed;
      the fifth rotation element is fixedly connected to the eighth rotation element such that the fifth and eighth rotation elements always rotate at a same speed; and
      the ninth rotation element is fixedly connected to the twelfth rotation element such that the ninth and twelfth rotation elements always rotate at a same speed.

2. The planetary gear train of claim 1, wherein:
   the fourth rotation element is selectively connected to the transmission housing;
   the third rotation element is selectively connected to the transmission housing;

the input shaft is selectively connected to the eighth rotation element;
the input shaft is selectively connected to the seventh rotation element;
the third rotation element is selectively connected to the seventh rotation element; and
the second rotation element is selectively connected to the transmission housing.

3. The planetary gear train of claim 1, wherein:
a sun gear, a planet carrier, and a ring gear of the first planetary gear set are set as the first, second, and third rotation elements;
a sun gear, a planet carrier, and a ring gear of the second planetary gear set are set as the fourth, fifth, and sixth rotation elements;
a sun gear, a planet carrier, and a ring gear of the third planetary gear set are set as the seventh, eighth, and ninth rotation elements; and
a sun gear, a planet carrier, and a ring gear of the fourth planetary gear set are set as the tenth, eleventh, and twelfth rotation elements.

4. A planetary gear train of an automatic transmission for a vehicle, comprising:
an input shaft receiving torque of an engine;
an output shaft outputting changed torque of the engine;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements; and
six friction elements disposed to selectively connect the rotation elements, or selectively connect at least one of the rotation elements and a transmission housing, wherein the planetary gear train of the automatic transmission for the vehicle further comprises:
a first rotation shaft including the first rotation element and fixedly connected to the input shaft; a second rotation shaft including the second rotation element and the sixth rotation element and selectively connected to the transmission housing;
a third rotation shaft including the third rotation element and selectively connected to the transmission housing;
a fourth rotation shaft including the fourth rotation element and the tenth rotation element and selectively connected to the transmission housing;
a fifth rotation shaft including the eighth rotation element and the fifth rotation element and selectively connected to the output shaft;
a sixth rotation shaft including the seventh rotation element and selectively connected to the third rotation shaft and the input shaft;
a seventh rotation shaft including the ninth rotation element and the twelfth rotation element; and
an eighth rotation shaft including the eleventh rotation element and the input shaft.

5. The planetary gear train of claim 4, wherein:
the first planetary gear set is a double pinion planetary gear set and includes a first sun gear as the first rotation element, a first ring gear as the second rotation element, and a planet carrier as the third rotation element;
the second planetary gear set is a single pinion planetary gear set and includes a second sun gear as the fourth rotation element, a second planet carrier as the fifth rotation element, and a second ring gear as the sixth rotation element;
the third planetary gear set is a single pinion planetary gear set and includes a third sun gear as the seventh rotation element, a third planet carrier as the eighth rotation element, and a third ring gear as the ninth rotation element; and
the fourth planetary gear set is a single pinion planetary gear set and includes a fourth sun gear as the tenth rotation element, a fourth planet carrier as the eleventh rotation element, and a fourth ring gear as the twelfth rotation element.

6. The planetary gear train of claim 4, wherein the six friction elements include:
a first clutch selectively connecting the input shaft and the fifth rotation shaft;
a second clutch selectively connecting the input shaft and the sixth rotation shaft;
a third clutch selectively connecting the third rotation shaft and the sixth rotation shaft;
a first brake selectively connecting the second rotation shaft and the transmission housing;
a second brake selectively connecting the fourth rotation shaft and the transmission housing; and
a third brake selectively connecting the third rotation shaft and the transmission housing.

7. The planetary gear train of claim 6, wherein speed stages achieved by selective operation of the six friction elements include:
a first forward speed stage achieved by simultaneous operation of the third clutch, the first brake and the second brake;
a second forward speed stage achieved by simultaneous operation of the third clutch, the second brake and the third brake;
a third forward speed stage achieved by simultaneous operation of the second clutch, the third clutch and the second brake;
a fourth forward speed stage achieved by simultaneous operation of the first clutch, the third clutch and the second brake;
a fifth forward speed stage achieved by simultaneous operation of the first clutch, the second clutch and the second brake;
a sixth forward speed stage achieved by simultaneous operation of the first clutch, the second clutch and the third clutch;
a seventh forward speed stage achieved by simultaneous operation of the first clutch, the second clutch and the third brake;
an eighth forward speed stage achieved by simultaneous operation of the first clutch, the third clutch and the third brake;
a ninth forward speed stage achieved by simultaneous operation of the first clutch, the third clutch and the first brake; and
a reverse speed stage achieved by simultaneous operation of the second clutch, the first brake and the second brake.

8. A planetary gear train of an automatic transmission for a vehicle, comprising:
an input shaft receiving torque of an engine;
an output shaft outputting changed torque of the engine;
a first planetary gear set being a double pinion planetary gear set and including first, second, and third rotation elements;

a second planetary gear set being a single pinion planetary gear set and including fourth, fifth, and sixth rotation elements;
a third planetary gear set being a single pinion planetary gear set and including seventh, eighth, and ninth rotation elements; and
a fourth planetary gear set being a single pinion planetary gear set and including tenth, eleventh, and twelfth rotation elements,
wherein the planetary gear train of the automatic transmission for the vehicle includes:
   a first rotation shaft including the first rotation element and fixedly connected to the input shaft;
   a second rotation shaft including the second rotation element and the sixth rotation element and selectively connected to the transmission housing;
   a third rotation shaft including the third rotation element and selectively connected to the transmission housing;
   a fourth rotation shaft including the fourth rotation element and the tenth rotation element and selectively connected to the transmission housing;
   a fifth rotation shaft including the fifth rotation element and the eighth rotation element and selectively connected to the input shaft;
   a sixth rotation shaft including the seventh rotation element and selectively connected to the third rotation shaft and the input shaft;
   a seventh rotation shaft including the ninth rotation element and the twelfth rotation element;
   an eighth rotation shaft including the eleventh rotation element and fixedly connected to the output shaft;
   a first clutch selectively connecting the input shaft and the fifth rotation shaft;
   a second clutch selectively connecting the input shaft and the sixth rotation shaft;
   a third clutch selectively connecting the third rotation shaft and the sixth rotation shaft;
   a first brake selectively connecting the second rotation shaft and the transmission housing;
   a second brake selectively connecting the fourth rotation shaft and the transmission housing; and
   a third brake selectively connecting the third rotation shaft and the transmission housing.

9. The planetary gear train of claim 8, wherein:
the first planetary gear set includes a first sun gear as the first rotation element, a first ring gear as the second rotation element, and a first planet carrier as the third rotation element;
the second planetary gear set includes a second sun gear as the fourth rotation element, a second planet carrier as the fifth rotation element, and a second ring gear as the sixth rotation element;
the third planetary gear set includes a third sun gear as the seventh rotation element, a third planet carrier as the eighth rotation element, and a third ring gear as the ninth rotation element; and
the fourth planetary gear set includes a fourth sun gear as the tenth rotation element, a fourth planet carrier as the eleventh rotation element, and a fourth ring gear as the twelfth rotation element.

10. The planetary gear train of claim 8, wherein speed stages achieved by selective operation of three friction elements among the six friction elements including the three clutches and the three brakes include:
   a first forward speed stage achieved by simultaneous operation of the third clutch, the first brake and the second brake;
   a second forward speed stage achieved by simultaneous operation of the third clutch, the second brake and the third brake;
   a third forward speed stage achieved by simultaneous operation of the second clutch, the third clutch and the second brake;
   a fourth forward speed stage achieved by simultaneous operation of the first clutch, the third clutch and the second brake;
   a fifth forward speed stage achieved by simultaneous operation of the first clutch, the second clutch and the second brake;
   a sixth forward speed stage achieved by simultaneous operation of the first clutch, the second clutch and the third clutch;
   a seventh forward speed stage achieved by simultaneous operation of the first clutch, the second clutch and the third brake;
   an eighth forward speed stage achieved by simultaneous operation of the first clutch, the third clutch and the third brake;
   a ninth forward speed stage achieved by simultaneous operation of the first clutch, the third clutch and the first brake; and
   a reverse speed stage achieved by simultaneous operation of the second clutch, the first brake and the second brake.

* * * * *